(12) United States Patent
Kikuchi et al.

(10) Patent No.: US 12,036,778 B2
(45) Date of Patent: Jul. 16, 2024

(54) LAMINATE INCLUDING LAYER OF ETHYLENE-α-OLEFIN-NONCONJUGATED POLYENE COPOLYMER COMPOSITION, AND APPLICATION THEREOF

(71) Applicants: MITSUI CHEMICALS, INC., Tokyo (JP); DAIKIN INDUSTRIES, LTD., Osaka (JP)

(72) Inventors: Yoshiharu Kikuchi, Ichihara (JP); Kotaro Ichino, Ichihara (JP); Kozue Osawa, Osaka (JP); Yuki Kuwajima, Osaka (JP)

(73) Assignees: Mitsui Chemicals, Inc. (JP); Daikin Industries, Ltd. (JP)

( * ) Notice: Subject to any disclaimer, the term of this patent is extended or adjusted under 35 U.S.C. 154(b) by 85 days.

(21) Appl. No.: 17/289,435

(22) PCT Filed: Oct. 31, 2019

(86) PCT No.: PCT/JP2019/042828
§ 371 (c)(1),
(2) Date: Apr. 28, 2021

(87) PCT Pub. No.: WO2020/090981
PCT Pub. Date: May 7, 2020

(65) Prior Publication Data
US 2022/0001657 A1 Jan. 6, 2022

(30) Foreign Application Priority Data
Nov. 2, 2018 (JP) ................................. 2018-207292

(51) Int. Cl.
| | | |
|---|---|---|
| B32B 27/32 | (2006.01) | |
| B32B 1/08 | (2006.01) | |
| B32B 27/08 | (2006.01) | |
| C08K 3/22 | (2006.01) | |
| C08K 3/36 | (2006.01) | |
| C08K 5/23 | (2006.01) | |
| C08K 5/39 | (2006.01) | |
| C08L 23/16 | (2006.01) | |

(52) U.S. Cl.
CPC .............. *B32B 27/322* (2013.01); *B32B 1/08* (2013.01); *B32B 27/08* (2013.01); *C08K 3/22* (2013.01); *C08K 3/36* (2013.01); *C08K 5/235* (2013.01); *C08K 5/39* (2013.01); *C08L 23/16* (2013.01); *B32B 2307/738* (2013.01); *C08K 2003/222* (2013.01)

(58) Field of Classification Search
None
See application file for complete search history.

(56) References Cited

U.S. PATENT DOCUMENTS

| | | | |
|---|---|---|---|
| 4,210,709 A | 7/1980 | Doi | |
| 4,675,355 A * | 6/1987 | Hirata | C08K 5/32 524/495 |
| 5,011,556 A * | 4/1991 | Yamaguchi | C08J 5/125 428/421 |
| 5,512,225 A * | 4/1996 | Fukushi | B32B 7/12 264/173.17 |
| 6,412,520 B1 | 7/2002 | Yasumatsu et al. | |
| 8,329,274 B2 | 12/2012 | Sakazaki et al. | |
| 9,539,792 B2 | 1/2017 | Higashika et al. | |
| 9,809,008 B2 | 11/2017 | Masui et al. | |
| 2007/0231522 A1 | 10/2007 | Sakazaki et al. | |
| 2009/0239014 A1 | 9/2009 | Noguchi et al. | |
| 2012/0107617 A1 | 5/2012 | Masui et al. | |
| 2013/0078472 A1 | 3/2013 | Higashika et al. | |
| 2019/0047264 A1 * | 2/2019 | Kikuchi | C08K 5/19 |

FOREIGN PATENT DOCUMENTS

| | | | | |
|---|---|---|---|---|
| EP | 0 761 753 A2 | 3/1997 | | |
| JP | 04-094930 A | 3/1992 | | |
| JP | 09-025374 A | 1/1997 | | |
| JP | 2000-329266 A | 11/2000 | | |
| JP | 2007-261079 A | 10/2007 | | |
| JP | 2011-201074 A | 10/2011 | | |
| JP | 5482790 B2 | 5/2014 | | |
| JP | 2015-123676 A | 7/2015 | | |
| WO | WO-2017150612 A1 * | 9/2017 | ............... | B32B 1/08 |

OTHER PUBLICATIONS

"Gomu No SP-Chi No Ichiran" List of SP values of Rubbers, Mar. 2, 2013 https://www.toishi.info/sozai/rubbers/sp.html.

* cited by examiner

*Primary Examiner* — Ramsey Zacharia
(74) *Attorney, Agent, or Firm* — Foley & Lardner LLP

(57) ABSTRACT

The present invention has an object of providing a laminate which is composed of a layer containing a melt shapable fluororesin and a layer of an ethylene-α-olefin-nonconjugated polyene copolymer composition, and is excellent in adhesiveness, and the present invention relates to a laminate including: a layer including an ethylene-α-olefin-nonconjugated polyene copolymer composition, and a layer comprising a melt shapable fluororesin; wherein the ethylene-α-olefin-nonconjugated polyene copolymer composition includes 100 parts by mass of an ethylene-α-olefin-nonconjugated polyene copolymer (A), 1.0 to 6.0 parts by mass of at least one compound (C) selected from the group consisting of 1,8-diazabicyclo(5.4.0)undecene-7 salts, 1,5-diazabicyclo(4.3.0)nonene-5 salts, 1,8-diazabicyclo(5.4.0)undecene-7 and 1,5-diazabicyclo(4.3.0)nonene-5, and 3 to 20 parts by mass of magnesium oxide.

11 Claims, No Drawings

LAMINATE INCLUDING LAYER OF ETHYLENE-α-OLEFIN-NONCONJUGATED POLYENE COPOLYMER COMPOSITION, AND APPLICATION THEREOF

CROSS-REFERENCE TO RELATED APPLICATIONS

The present application claims priority under 37 U.S.C. § 371 to International Patent Application No. PCT/JP2019/042828, filed Oct. 31, 2019, which claims priority to and the benefit of Japanese Patent Application No. 2018-207292, filed on Nov. 2, 2018. The contents of these applications are hereby incorporated by reference in their entireties.

TECHNICAL FIELD

The present invention relates to a laminate having a layer containing a melt shapable fluororesin and a layer of an ethylene-α-olefin-nonconjugated polyene copolymer composition.

BACKGROUND ART

Automobiles, industrial machines, construction machines, motorbikes, farm machines and the like are installed with various types of hoses such as radiator hoses for cooling engines, drain hoses for radiator overflow, heater hoses for indoor heating, air conditioner drain hoses, hoses for wiper water supply, roof drain hoses and protect hoses. For these hoses, there are used ethylene/propylene/diene copolymers (EPDM), which are good in ozone resistance, weather resistance and heat resistance.

For example, Patent Document 1 proposes a radiator hose using, as its outermost layer, a vulcanized rubber which has an ethylene/α-olefin/non-conjugated diene copolymer as its rubber component and has a volume electric resistivity at 30% compression of $10^5$ Ω·cm or higher.

On the other hand, since olefinic polymers such as the ethylene-α-olefin-nonconjugated polyene copolymer are inferior in permeability resistance to volatile substances such as gasoline, there is proposed, for example, lamination of a layer of a thermoplastic elastomer such as a TPO (thermoplastic olefin) and a layer of a fluororesin (Patent Document 2).

Further Patent Document 3 proposes that in order to improve the adhesiveness of a rubber layer with a fluororesin layer, at least one compound (a2) selected from the group consisting of 1,8-diazabicyclo(5.4.0)undecene-7 salts, 1,5-diazabicyclo(4.3.0)nonene-5 salts, 1,8-diazabicyclo(5.4.0)undecene-7 and 1,5-diazabicyclo(4.3.0)nonene-5, or the like is contained in an amount of 2.0 parts by mass or smaller as a more preferable amount in an unvulcanized rubber. Then, in Examples of Patent Document 3, an example is described in which NBR is used as an unvulcanized rubber and a mixture with a compound (a2) is contained in 3.1 parts by mass at most and a DBU formic acid salt is contained in 2.0 parts by mass at most.

In Patent Document 3, although it is described that as an example of an unvulcanized rubber, an ethylene-propylene-termonomer copolymer rubber (ethylene-α-olefin-nonconjugated polyene copolymer) can also be used, there is no description, in Examples, of the case of using an ethylene-α-olefin-nonconjugated polyene copolymer in place of NBR described in Examples.

CITATION LIST

Patent Documents

Patent Document 1: JP H9-25374 A
Patent Document 2: JP 2000-329266 A
Patent Document 3: Japanese Patent No. 5482790

SUMMARY OF INVENTION

Technical Problem

Then, the present inventors have variously studied with an object to provide a laminate which comprises a layer comprising a melt shapable fluororesin and a layer of an ethylene-α-olefin-nonconjugated polyene copolymer composition, and is excellent in adhesiveness.

Solution to Problem

As a result, it has been found that by blending a specific diazabicycloundecene compound or the like with an ethylene-α-olefin-nonconjugated polyene copolymer, adhesiveness with a melt shapable fluororesin is improved; and this finding has led to the present invention.

That is, the present invention relates to a laminate comprising: a layer comprising an ethylene-α-olefin-nonconjugated polyene copolymer composition, and a layer comprising a melt shapable fluororesin; wherein the ethylene-α-olefin-nonconjugated polyene copolymer composition comprises
  100 parts by mass of an ethylene-α-olefin-nonconjugated polyene copolymer (A),
  1.0 to 6.0 parts by mass of at least one compound (C) selected from the group consisting of 1,8-diazabicyclo(5.4.0)undecene-7 salts, 1,5-diazabicyclo(4.3.0)nonene-5 salts, 1,8-diazabicyclo(5.4.0)undecene-7 and 1,5-diazabicyclo(4.3.0)nonene-5, and
  3 to 20 parts by mass of magnesium oxide.

Advantageous Effect of Invention

The laminate of the present invention is excellent in adhesion strength between a layer comprising a melt shapable fluororesin and a layer comprising an ethylene-α-olefin-nonconjugated polyene copolymer composition.

DESCRIPTION OF EMBODIMENTS

Hereinafter, embodiments according to the present invention will be described.

The laminate of the present invention is excellent in adhesion strength between a layer comprising a melt shapable fluororesin and a layer comprising an ethylene-α-olefin-nonconjugated polyene copolymer composition.

The laminate of the present invention, since comprising a layer comprising a melt shapable fluororesin, is excellent also in permeability resistance to a fuel, such as gasoline resistance.

The laminate of the present invention, since comprising a layer comprising an ethylene-α-olefin-nonconjugated polyene copolymer composition, is excellent also in ozone resistance, weather resistance and heat resistance.

«Ethylene/α-olefin/Non-Conjugated Polyene Copolymer (A)»

An ethylene/α-olefin/non-conjugated polyene copolymer (A) (hereinafter, abbreviated to "copolymer (A)" in some cases) constituting a layer comprising an ethylene/α-olefin/non-conjugated polyene copolymer composition (hereinafter, abbreviated to "copolymer composition" in some cases) for constituting one layer of the laminate of the present invention is an ethylene/α-olefin/non-conjugated polyene copolymer made by randomly copolymerizing ethylene with an α-olefin having 3 or more carbon atoms and a non-conjugated polyene.

The above α-olefin is usually an α-olefin having 3 to 20 carbon atoms; among these, preferable are α-olefins having 3 to 10 carbon atoms, such as propylene, 1-butene, 4-methyl-1-pentene, 1-hexene and 1-octene, and propylene and 1-butene are especially preferably used.

As specific examples of the ethylene/α-olefin/non-conjugated polyene copolymer (A) according to the present invention, preferably used are ethylene/propylene/non-conjugated polyene copolymers, and ethylene/1-butene/non-conjugated polyene copolymers.

The ethylene/α-olefin/non-conjugated polyene copolymer (A) according to the present invention is desirably one in which the molar ratio (ethylene/α-olefin) of ethylene to α-olefin is usually in the range of 40/60 to 90/10, preferably 50/50 to 80/20 and especially preferably 55/45 to 70/30.

As the above non-conjugated polyene, cyclic or chain non-conjugated polyenes are used. Examples of the cyclic non-conjugated polyenes include 5-ethylidene-2-norbornene, dicyclopentadiene, 5-vinyl-2-norbornene, norbornadiene and methyltetrahydroindene. Examples of the chain non-conjugated polyenes include 1,4-hexadiene, 7-methyl-1,6-octadiene, 8-methyl-4-ethylidene-1,7-nonadiene and 4-ethylidene-1,7-undecadiene. These non-conjugated polyenes are used singly or as a mixture of two or more, and it is desirable that the content in the copolymer is, in terms of iodine value, 1 to 40, preferably 2 to 35 and more preferably 3 to 30.

In the ethylene/α-olefin/non-conjugated polyene copolymer (A) according to the present invention, the intrinsic viscosity [η] as measured in decahydronaphthalene at 135° C. is usually 0.8 to 4 dl/g, preferably 1 to 3.5 dl/g and more preferably 1.1 to 3 dl/g.

The ethylene/α-olefin/non-conjugated polyene copolymer (A) according to the present invention may be a modified substance thereof made by being graft copolymerized with an unsaturated carboxylic acid or a derivative thereof, for example, an acid anhydride.

The ethylene/α-olefin/non-conjugated polyene copolymer (A) according to the present invention is most preferably an ethylene/propylene/non-conjugated diene copolymer.

The ethylene/α-olefin/non-conjugated polyene copolymer (A) according to the present invention can be used singly or in a combination of two or more. The ethylene/α-olefin/non-conjugated polyene copolymer (A) having the above-mentioned properties can be prepared by a known method described in "Polymer Seizo Process" (Polymer Production Process) (published by Kogyo Chosakai Publishing, Ltd., pp. 309-330), or the like.

«Compound (C)»

The compound (C) which is one of components contained in the ethylene-α-olefin-nonconjugated polyene copolymer composition according to the present invention is at least one compound selected from the group consisting of 1,8-diazabicyclo(5.4.0)undecene-7 salts (DBU salts), 1,5-diazabicyclo(4.3.0)nonene-5 salts (DBN salts), 1,8-diazabicyclo(5.4.0)undecene-7 (DBU) and 1,5-diazabicyclo(4.3.0)nonene-5 (DBN).

The DBU salts and the DBN salts include carbonate salts, long-chain aliphatic carboxylate salts, aromatic carboxylate salts, orthophthalate salts, p-toluenesulfonate salts, phenol salts, phenol resin salts, naphthoate salts, octylate salts, oleate salts, formate salts and phenol novolac resin salts of DBU or DBN; and preferable is at least one compound selected from the group consisting of 1,8-benzyl-diazabicyclo(5.4.0)-7-undecenium chloride (DBU-B), the naphthoate salts, the orthophthalate salts, the phenol salts and the formate salts.

More specifically, the compound (C) is preferably at least one compound selected from the group consisting of 1,8-diazabicyclo(5.4.0)undecene-7, 1,8-benzyl-1,8-diazabicyclo(5.4.0)-7-undecenium chloride, a naphthoate salt of 1,8-diazabicyclo(5.4.0)undecene-7, a phenol salt of 1,8-diazabicyclo(5.4.0)undecene-7, an orthophthalate salt of 1,8-diazabicyclo(5.4.0)undecene-7 and a formate salt of 1,8-diazabicyclo(5.4.0)undecene-7.

Among these, especially preferable is a formate salt of 1,8-diazabicyclo(5.4.0)undecene-7.

«Magnesium Oxide»

Magnesium oxide which is one of the components contained in the ethylene-α-olefin-nonconjugated polyene copolymer composition according to the present invention is an oxide of magnesium used generally as a vulcanization aid.

«Metal Salt»

A metal salt contained in the ethylene-α-olefin-nonconjugated polyene copolymer composition according to the present invention is preferably a dialkylcarbamic acid metal salt and especially preferably a copper salt of dimethyldithiocarbamic acid or a zinc salt of dibutyldithiocarbamic acid.

«Mineral Oil-Based Softener (B)»

Examples of a softener include petroleum-based substances such as process oil, lubricating oil, paraffin, liquid paraffin, petroleum asphalt and vaseline, coal tars such as coal tar and coal tar pitch, fatty oils such as castor oil, linseed oil, rapeseed oil and coconut oil, tall oil, rubber substitutes, waxes such as beeswax, carnauba wax and lanoline, ricinolates, fatty acids and metal salts thereof such as palmitic acid, barium stearate and calcium stearate, synthetic polymeric substances such as petroleum resins, atactic polypropylene and cumarone indene resins, ester-based plasticizers such as dioctyl phthalate and dioctyl adipate, and besides, microcrystalline wax and rubber substitutes (factices).

The mineral oil-based softener contained in the ethylene-α-olefin-nonconjugated polyene copolymer composition according to the present invention is a mineral oil-based softener selected from paraffinic process oil, naphthenic process oil and aromatic process oil.

The paraffinic process oil includes Diana Process Oil PW-32, PW-90, PW-150, PW-380, PS-32, PS-90, PS-430, PX-32 and PX-90 (trade names, manufactured by Idemitsu Kosan Co., Ltd.), Stanol 40, 43N, 52, 69, 149, LP40 and LP69 and Flexon 845 (trade names, manufactured by Esso Petroleum Co., Ltd.), Syntac PA-95, PA-100 and PA-140 (trade names, manufactured by Kobe Oil Chemical Industrial Co., Ltd.), Cosmo Process 10, 40 and 40C (trade names, manufactured by Cosmo Oil Co., Ltd.), Lubflex 26, 100 and 400 (trade names, manufactured by Shell Japan Ltd.), Kyoseki Process P-200, P-300 and P-500 (trade names, manufactured by Japan Energy Corp.), Sunper 110, 115, 120, 130, 150, 180, 2100, 2210 and 2280 (trade names, manufactured by Japan Sun Oil Co., Ltd.), Fukkol P-200, P-400 and P-500 (trade names, manufactured by Fuji Kosan Co., Ltd.), and Mitsubishi 10 and Mitsubishi 12 (trade names, manufactured by Mitsubishi Oil Co., Ltd.).

The naphthenic process oil includes Diana Process Oil NS-24, NS-100, NM-26, NM-68, NM-150, NM-280, NP-24, NU-80 and NF-90 (trade names, manufactured by Idemitsu Kosan Co., Ltd.), Esso Process Oil 725 and 765 (trade names, manufactured by Esso Petroleum Co., Ltd.), Syntac N-40, N-60, N-70, N-75 and N-85 (trade names, manufactured by Kobe Oil Chemical Industrial Co., Ltd.), Shell Flex 371JY, 371N, 451, N-40, 22, 22R, 32R, 100R, 1005, 100SA, 220RS, 220S, 260, 320R and 680 (trade names, manufactured by Shell Japan Ltd.), Kyoseki Process R-50, R-200 and R-1000 (trade names, manufactured by Japan Energy Corp.), Sunthene 310, 380, 410, 415, 420, 430, 450, 480, 3215, 4130 and 4240 and CiroLight R.P.O. (trade names, manufactured by Japan Sun Oil Co., Ltd.), Comolex No. 2 and Comolex F22 (trade names, manufactured by Nippon Oil Co., Ltd.), Fukkol 1150N and 1400N (trade names, manufactured by Fuji Kosan Co., Ltd.), Mitsubishi 20 (trade name, manufactured by Mitsubishi Oil Co., Ltd.), Naprex 32 and 38 (trade names, manufactured by Mobil Sekiyu KK), and Petrex PN-3 (trade name, manufactured by Yamabun Yuka Co., Ltd.).

The aromatic process oil includes Diana Process Oil AC-12, AC-460, AE-24, AE-50, AE-200, AH-16 and AH-58 (trade names, manufactured by Idemitsu Kosan Co., Ltd.), Esso Process Oil 110 and 120 (trade names, manufactured by Esso Petroleum Co., Ltd.), Syntac HA-10, HA-15, HA-30 and HA-35 (trade names, manufactured by Kobe Oil Chemical Industrial Co., Ltd.), Cosmo Process 40A (trade name, manufactured by Cosmo Oil Co., Ltd.), Dutrex 729UK and 739 (Shell Japan Ltd.), Kyoseki Process X100-A and X100 (trade names, manufactured by Japan Energy Corp.), JSOAroma 790 (trade name, manufactured by Japan Sun Oil Co., Ltd.), Comolex 300 and 700 (trade names, manufactured by Nippon Oil Co., Ltd.), Aromax #1, #3 and #5 (trade names, manufactured by Fuji Kosan Co., Ltd.), Heavy Process Oil Mitsubishi 34, Mitsubishi 38 and Mitsubishi 44 (trade names, manufactured by Mitsubishi Oil Co., Ltd.), Mobil Sol K, 22, 30 and 130 (trade names, manufactured by Mobil Sekiyu KK), and Petrex LPO-R, LPO-V, PF-1 and PF-2 (trade name, manufactured by Yamabun Yuka Co., Ltd.).

Among these, a naphthenic process oil or an aromatic process oil is preferable.

«Basic Silica»

A basic silica contained in the ethylene-α-olefin-nonconjugated polyene copolymer composition according to the present invention is preferably a silica whose pH is in the range of 8 to 14.

<Ethylene-α-Olefin-Nonconjugated Polyene Copolymer Composition>

The ethylene-α-olefin-nonconjugated polyene copolymer composition according to the present invention is a composition comprising 100 parts by mass of the copolymer (A), and the compound (C) in the range of 1.0 to 6.0 parts by mass, preferably 1.2 to 6.0 parts by mass and more preferably 1.5 to 6.0 parts by mass, and the magnesium oxide in the range of 3 to 20 parts by mass, preferably 5 to 20 parts by mass and still more preferably 7 to 15 parts by mass.

The ethylene-α-olefin-nonconjugated polyene copolymer composition comprising the compound (C) and the magnesium oxide in the above amount ranges is excellent in adhesion strength with a melt shapable fluororesin.

The ethylene-α-olefin-nonconjugated polyene copolymer composition according to the present invention comprises, in addition to the compound (C) and the magnesium oxide, preferably 0.1 to 10 parts by mass, more preferably 0.2 to 5 parts by mass of the dialkylcarbamic acid metal salt, preferably 0 to 200 parts by mass, more preferably 0 to 50 parts by mass of the mineral oil-based softener (B), and preferably 0 to 100 parts by mass, more preferably 0 to 70 parts by mass of the basic silica.

The ethylene-α-olefin-nonconjugated polyene copolymer composition comprising the mineral oil-based softener (B) is excellent in adhesion strength with a fuel barrier polymer layer.

Further the ethylene-α-olefin-nonconjugated polyene copolymer composition comprising the dialkylcarbamic acid metal salt, the mineral oil-based softener (B) and the basic silica is more improved in adhesion strength with the melt shapable fluororesin.

The copolymer composition according to the present invention, in addition to the above components, may contain other components according to desired purposes, in such a range not to impair advantageous effects of the present invention. As the other components, there may be contained at least one selected from fillers, crosslinking agents, crosslinking aids, vulcanization accelerators, vulcanization aids, antioxidants, processing aids, activators, heat-resistant stabilizers, weathering stabilizers, antistatic agents, colorants, lubricants, thickeners, foaming agents and foaming aids. Each of these additives may be used singly in one kind or concurrently used in two or more.

<Filler>

The filler constituting the copolymer composition according to the present invention is a known rubber reinforcing agent contained in rubber compositions, and usually carbon black or an inorganic substance referred to as an inorganic reinforcing agent.

The filler according to the present invention specifically includes carbon blacks such as Asahi #55G and Asahi #60G (the forgoing, manufactured by Asahi Carbon Co., Ltd.) and Seast (SRF, GPF, FEF, MAF, HAF, ISAF, SAF, FT, MT and the like) (manufactured by Tokai Carbon Co., Ltd.), fillers that are formed by surface-treating these carbon blacks with a silane coupling agent or the like, activated calcium carbonate, fine powder talc, fine powder silicic acid, light precipitated calcium carbonate, heavy calcium carbonate, talc and clay.

<Crosslinking Agent, Crosslinking Aid, Vulcanization Accelerator and Vulcanization Aid>

The crosslinking agent includes crosslinking agents used usually in crosslinking of rubber, such as organic peroxides, phenol resins, sulfur-based compounds, hydrosilicone-based compounds, amino resins, quinone or derivatives thereof, amine-based compounds, azo-based compounds, epoxy-based compounds and isocyanate-based compounds. Among these, organic peroxides and sulfur-based compounds (hereinafter, referred to also as "vulcanizing agents") are suitable.

Examples of the organic peroxides include dicumyl peroxide (DCP), di-tert-butyl peroxide, 2,5-di-(tert-butylperoxy)hexane, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide and tert-butylcumyl peroxide.

When the organic peroxide is used as the crosslinking agent, the content thereof in the copolymer composition is, with respect to 100 parts by mass of the copolymer (A), usually 0.1 to 20 parts by mass, preferably 0.2 to 15 parts by mass and more preferably 0.5 to 10 parts by mass. In the above range of the content of the organic peroxide, the case is suitable because no blooming occurs onto the surface of shaped products to be obtained and the copolymer composition exhibits excellent crosslinking properties.

When the organic peroxide is used as the crosslinking agent, concurrent use of a crosslinking aid is preferable. Examples of the crosslinking aid include sulfur; quinone dioxime-based crosslinking aids such as p-quinone dioxime; acrylic crosslinking aids such as ethylene glycol dimethacrylate and trimethylolpropane trimethacrylate; allyl crosslinking aids such as diallyl phthalate and triallyl isocyanurate; maleimide-based allyl crosslinking aids; divinylbenzene; and metal oxides such as zinc oxide (for example, ZnO #1, zinc oxide class 2 (JIS Standard (K1410)), manufactured by Hakusui Tech Co., Ltd.), magnesium oxide, zinc white (zinc oxide, for example, "META-Z102" (trade name, manufactured by Inoue Calcium Corp.), and active zinc white.

When the crosslinking aid is used, the content thereof in the copolymer composition is, with respect to 1 mol of the organic peroxide, usually 0.5 to 10 mol, preferably 0.5 to 7 mol and more preferably 1 to 6 mol.

Examples of the sulfur-based compound (vulcanizing agent) include sulfur, sulfur chloride, sulfur dichloride, morpholine disulfide, alkylphenol disulfides, tetramethylthiuram disulfide and selenium dithiocarbamate.

When the sulfur-based compound is used as the crosslinking agent, the content thereof in the copolymer composition is, with respect to 100 parts by mass of the copolymer (A), usually 0.3 to 10 parts by mass, preferably 0.5 to 7.0 parts by mass and more preferably 0.7 to 5.0 parts by mass. When the content of the sulfur-based compound is in the above range, no blooming occurs onto the surface of shaped products to be obtained, and the copolymer composition exhibits excellent crosslinking properties.

When the sulfur-based compound is used as the crosslinking agent, concurrent use of a vulcanization accelerator is preferable.

Examples of the vulcanization accelerator include thiazole vulcanization accelerators such as N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (for example, Sanceler M (trade name, manufactured by Sanshin Chemical Industry Co., Ltd.)), 2-(4-morpholinodithio)benzothiazole (for example, Nocceler MDB-P (trade name, manufactured by Ouchi Shinko Chemical Industrial Co., Ltd.)), 2-(2,4-dinitrophenyl)mercaptobenzothiazole, 2-(2,6-diethyl-4-morpholinothio)benzothiazole and dibenzothiazyl disulfide (for example, Sanceler DM (trade name, manufactured by Sanshin Chemical Industry Co., Ltd.)); guanidine vulcanization accelerators such as diphenylguanidine, triphenylguanidine and diorthotolylguanidine; aldehyde amine vulcanization accelerators such as acetaldehyde-aniline condensates and butyraldehyde-aniline condensates; imidazoline vulcanization accelerators such as 2-mercaptoimidazoline; thiuram vulcanization accelerators such as tetramethylthiuram monosulfide (for example, Sanceler TS (trade name, manufactured by Sanshin Chemical Industry Co., Ltd.)), tetramethylthiuram disulfide (for example, Sanceler TT (trade name, manufactured by Sanshin Chemical Industry Co., Ltd.)), tetraethylthiuram disulfide (for example, Sanceler TET (trade name, manufactured by Sanshin Chemical Industry Co., Ltd.)), tetrabutylthiuram disulfide (for example, Sanceler TBT (trade name, manufactured by Sanshin Chemical Industry Co., Ltd.)) and dipentamethylenethivam tetrasulfide (for example, Sanceler TRA (trade name, manufactured by Sanshin Chemical Industry Co., Ltd.)); dithioate salt vulcanization accelerators such as tellurium diethyldithiocarbamate; thiourea vulcanization accelerators such as ethylenethiourea (for example, Sanceler BUR, Sanceler 22-C (trade names, manufactured by Sanshin Chemical Industry Co., Ltd.)), N,N'-diethylthiourea and N,N'-dibutylthiourea; and xanthate vulcanization accelerators such as zinc dibutylxanthate.

When the vulcanization accelerator is used, the content of the vulcanization accelerator in the copolymer composition is, with respect to 100 parts by mass of the copolymer (A), usually 0.1 to 20 parts by mass, preferably 0.2 to 15 parts by mass and more preferably 0.5 to 10 parts by mass. In the above range of the content of the vulcanization accelerator, no blooming occurs on the surface of shaped products to be obtained and the copolymer composition exhibits excellent crosslinking properties. When a sulfur-based compound is used as the crosslinking agent, the vulcanization aid can be used concurrently.

Examples of the vulcanization aids include zinc oxide (for example, ZnO#1, zinc oxide class 2, manufactured by Hakusui Tech Co., Ltd.), magnesium oxide and zinc white (zinc oxide, for example, "META-Z102" (trade name, manufactured by Inoue Calcium Corp.).

When the vulcanization aid is used, the content of the vulcanization aid in the copolymer composition is, with respect to 100 parts by mass of the copolymer (A), usually 1 to 20 parts by mass.

<Antioxidant (Stabilizer)>

By inclusion of the antioxidant (stabilizer) in the copolymer composition according to the present invention, the life of seal packings formed therefrom can be extended. Such an antioxidant includes conventionally known antioxidants, for example, amine antioxidants, phenolic antioxidants and sulfur-based antioxidants.

Examples of the antioxidant include aromatic secondary amine antioxidants such as phenylbutylamine and N,N-di-2-naphthyl-p-phenylenediamine; phenolic antioxidants such as dibutylhydroxytoluene and tetrakis[methylene(3,5-di-t-butyl-4-hydroxy)hydro-cinnamate]methane; thioether antioxidants such as bis[2-methyl-4-(3-n-alkylthiopropionyloxy)-5-t-butylphenyl] sulfide, dithiocarbamate salt antioxidants such as nickel dibutyldithiocarbamate; and sulfur-based antioxidants such as 2-mercaptobenzoylimidazole, 2-mercaptobenzimidazole, a zinc salt of 2-mercaptobenzimidazole, dilauryl thiodipropionate and distearyl thiodipropionate.

When the copolymer composition contains the antioxidant, the content of the antioxidant is, with respect to 100 parts by mass of the copolymer (A), usually 0.3 to 10 parts by mass and preferably 0.5 to 7.0 parts by mass. In the above range of the content of the antioxidant, no blooming occurs on the surface of shaped products to be obtained, and occurrence of the vulcanization inhibition can also be suppressed.

<Processing Aid>

As the processing aid, a broad range of processing aids usually contained in rubbers can be used. The processing aid specifically includes ricinolic acid, stearic acid, palmitic acid, lauric acid, barium stearate, zinc stearate, calcium stearate, zinc laurate, and esters thereof. Among these, stearic acid is preferable.

When the copolymer composition according to the present invention contains the processing aid, the processing aid can be suitably contained usually in an amount of 1 to 3 parts by mass with respect to 100 parts by mass of the copolymer (A). The above range of the content of the processing aid is suitable because of being excellent in processability including kneadability, extrudability and injection moldability.

The above processing aids may be used singly in one kind thereof or in two or more kinds thereof.

<Activator>

Examples of the activator include amines such as di-n-butylamine, dicyclohexylamine and monoethanolamine; activators such as diethylene glycol, polyethylene glycol, lecithin, triallyl trimellitate and zinc compounds of aliphatic carboxylic acids or aromatic carboxylic acids; zinc peroxide preparations; and octadecyltrimethylammonium bromide, synthetic hydrotalcite, and special quaternary ammonium compounds.

When the copolymer composition contains the activator, the content of the activator is, with respect to 100 parts by mass of the copolymer (A), usually 0.2 to 10 parts by mass and preferably 0.3 to 5 parts by mass.

A production method of the copolymer composition according to the present invention involves kneading, at a temperature of 80 to 170° C. for 2 to 20 min, the copolymer (A), the compound (C), the magnesium oxide, further the dialkylcarbamic acid metal salt, the mineral oil-based softener (B) and the basic silica, and as required, additionally the filler, the processing aid, the crosslinking agent and the like by an internal mixer (closed type mixer) such as a Banbury mixer, a kneader or an Intermix. Then, additives such as the crosslinking agent, the softener, the crosslinking aid and the vulcanization accelerator, and as required, additionally the vulcanization accelerator and the crosslinking aid, are added to and blended in the obtained blend, and kneaded, by using a roll such as an open roll or a kneader at a roll temperature of 40 to 80° C. for 5 to 30 min, and thereafter sheeted, whereby the copolymer compositions can be prepared.

When the kneading temperature by the internal mixer or the like is low, dicumyl peroxide may be kneaded simultaneously together with the copolymer rubber (A) and the like.

«Melt Shapable Fluororesin»

"Melt shapable" means exhibiting melt flowability.

The "exhibiting melt flowability" means that a temperature exists which is equal to or higher than a melting point of a resin and at which the MFR (Melt Flow Rate) of the resin under the condition of a load of 5 kg is in the range of 0.1 to 1,000 g/10 min.

"Melting point" means the temperature corresponding to the maximum value of the melting peak measured by differential scanning colorimetry (DSC).

Examples of the melt shapable fluororesin constituting the layer comprising the melt shapable fluororesin (hereinafter, referred to as "fluororesin" in some cases) forming one layer of the laminate of the present invention include various known melt shapable fluororesins such as tetrafluoroethylene•perfluoroalkyl vinyl ether copolymers (PFA), copolymers (CTFE copolymers) having a chlorotrifluoroethylene (CTFE) unit, tetrafluoroethylene•hexafluoropropylene copolymers (FEP), tetrafluoroethylene•ethylene copolymers (ETFE), polychlorotrifluoroethylene (PCTFE), chlorotrifluoroethylene•ethylene copolymers (ECTFE), polyvinylidene fluoride (PVDF) and polyvinyl fluoride (PVF), tetrafluoroethylene•hexafluoropropylene•vinylidene fluoride copolymers (THV) and tetrafluoroethylene•vinylidene fluoride copolymers.

Among these melt shapable fluororesins, preferable are copolymers (CTFE copolymers) having a chlorotrifluoroethylene (CTFE) unit, tetrafluoroethylene•ethylene copolymers (ETFE), polychlorotrifluoroethylene (PCTFE), tetrafluoroethylene•hexafluoropropylene•vinylidene fluoride copolymers (THV), and tetrafluoroethylene•vinylidene fluoride copolymers; more preferable are copolymers (CTFE copolymers) having a chlorotrifluoroethylene (CTFE) unit, and tetrafluoroethylene•hexafluoropropylene•vinylidene fluoride copolymers (THV); and most preferable is copolymers (CTFE copolymers) having a chlorotrifluoroethylene (CTFE) unit.

The PCTFE is a homopolymer of chlorotrifluoroethylene.

The CTFE copolymer preferably contains a copolymerization unit (CTFE unit) originated from CTFE, and a copolymerization unit originated from at least one monomer selected from the group consisting of tetrafluoroethylene (TFE unit), hexafluoropropylene (HFP unit), perfluoro(alkyl vinyl ether) (PAVE unit), vinylidene fluoride (VdF unit), vinyl fluoride, hexafluoroisobutene, a monomer represented by the formula: $CH_2=CX^1(CF_2)_nX^2$ (wherein $X^1$ is H or F, $X^2$ is H, F or Cl, and n is an integer of 1 to 10), ethylene, propylene, 1-butene, 2-butene, vinyl chloride and vinylidene chloride.

The CTFE copolymer more preferably contains the CTFE unit, and a copolymerization unit originated from at least one monomer selected from the group consisting of TFE, HFP and PAVE, and still more preferably consists substantially of these copolymerization units only. Further, from the viewpoint of low fuel permeability, the CTFE copolymer preferably contains no monomer having a CH bond, such as ethylene, vinylidene fluoride or vinyl fluoride. Although adhesion of a perhalopolymer with a rubber is usually difficult, according to the constitution of the present invention, even if the fluororesin is a perhalopolymer, the interlayer adhesion is firm between a layer containing the fluororesin and a layer containing the ethylene-α-olefin-nonconjugated polyene copolymer composition.

The CTFE copolymer preferably has the CTFE unit in an amount of 10 to 90% by mol of the whole of the monomer units. The CTFE unit is especially preferably one containing the CTFE unit, the TFE unit and a monomer (a) unit originated from a monomer (a) copolymerizable with these.

The "CTFE unit" and the "TFE unit" are, in the molecular structure of the CTFE copolymer, a moiety (—CFCl—CF$_2$—) originated from CTFE, and a moiety (—CF$_2$—CF$_2$—) originated from TFE, respectively; and the "monomer (a) unit" is, in the molecular structure of the CTFE copolymer, similarly a moiety made by addition of the monomer (a).

The monomer (a) is not limited as long as being a monomer copolymerizable with CTFE and TFE, and includes ethylene (Et), vinylidene fluoride (VdF), perfluoro (alkyl vinyl ether) (PAVE) represented by $CF_2=CF—ORf^1$ (wherein $Rf^1$ is a perfluoroalkyl group having 1 to 8 carbon atoms), vinyl monomers represented by $CX^3X^4=CX^5(CF_2)_nX^6$ (wherein $X^3$, $X^4$ and $X^5$ are the same or different, and is a hydrogen atom or a fluorine atom; $X^6$ is a hydrogen atom, a fluorine atom or a chlorine atom; and n is an integer of 1 to 10), and alkyl perfluorovinyl ether derivatives represented by $CF_2=CF—OCH_2—Rf^2$ (wherein $Rf^2$ is a perfluoroalkyl group having 1 to 5 carbon atoms); and among these, preferable is at least one selected from the group consisting of PAVE, the vinyl monomers and the alkyl perfluorovinyl ether derivatives; and more preferable is at least one selected from the group consisting of PAVE and HFP.

As the alkyl perfluorovinyl ether derivative, preferable is one in which $Rf^2$ is a perfluoroalkyl group having 1 to 3 carbon atoms; and more preferable is $CF_2=CF—OCH_2—CF_2CF_3$.

With regard to the ratio of the CTFE unit and the TFE unit in the CTFE copolymer, with respect to 15 to 90% by mol of the CTFE unit, the TFE unit accounts for 85 to 10% by mol; and more preferably, the CTFE unit accounts for 20 to 90% by mol and the TFE unit accounts for 80 to 10% by mol. More preferable is the CTFE copolymer constituted of 15 to 25% by mol of the CTFE unit and 85 to 75% by mol of the TFE unit.

The CTFE copolymer is preferably one in which the total of the CTFE unit and the TFE unit is 90 to 99.9% by mol and the monomer (a) unit is 0.1 to 10% by mol. When the monomer (a) unit is less than 0.1% by mol, the CTFE copolymer is liable to be inferior in shapability, environmental stress crack resistance and fuel crack resistance; and when exceeding 10% by mol, the CTFE copolymer is likely to be inferior in low fuel permeability, heat resistance and mechanical properties.

The fluororesin according to the present invention is preferably a PCTFE or a CTFE-TFE-PAVE copolymer, and most preferably a CTFE-TFE-PAVE copolymer.

The CTFE-TFE-PAVE copolymer is a copolymer consisting substantially of CTFE, TFE and PAVE only. In the PCTFE and the CTFE-TFE-PAVE copolymer, there is present no hydrogen atom bonded directly to carbon atoms constituting their main chain and no dehydrofluorination reaction progresses.

The PAVE includes perfluoro(methyl vinyl ether) (PMVE), perfluoro(ethyl vinyl ether) (PEVE), perfluoro(propyl vinyl ether) (PPVE) and perfluoro(butyl vinyl ether); among these, preferable is at least one selected from the group consisting of PMVE, PEVE and PPVE.

The PAVE unit is preferably 0.5% by mol or more of the whole of the monomer units, and preferably 5% by mol or less thereof.

The constituent units such as the CTFE unit are values obtained by $^{19}$F-NMR analysis.

Since the tetrafluoroethylene•hexafluoropropylene•vinylidene fluoride copolymer (THV), when the VdF content rate is low, is excellent in low fuel permeability, with regard to the copolymerization proportions (ratios in % by mol) of TFE, HFP and VdF, TFE/HFP/VdF is preferably 50 to 95/0.1 to 10/0.1 to 40 and more preferably 70 to 90/0.1 to 10/0.1 to 25. The TFE/HFP/VdF copolymer may further contain 0 to 20% by mol of other monomers. The other monomers include at least one selected from the group consisting of fluorine-containing monomers such as tetrafluoroethylene, hexafluoropropylene, perfluoro(methyl vinyl ether), perfluoro(ethyl vinyl ether), perfluoro(propyl vinyl ether), chlorotrifluoroethylene, 2-chloropentafluoropropene and perfluorinated vinyl ethers (for example, perfluoroalkoxy vinyl ethers such as $CF_3$—O—$CF_2CF_2CF_2$—O—CF=$CF_2$), perfluoroalkyl vinyl ethers, perfluoro-1,3-butadiene, trifluoroethylene, hexafluoroisobutene, vinyl fluoride, ethylene, propylene and alkyl vinyl ethers; and preferable are perfluoro(methyl vinyl ether), perfluoro(ethyl vinyl ether) and perfluoro(propyl vinyl ether). The melting point of the tetrafluoroethylene•hexafluoropropylene•vinylidene fluoride copolymer is preferably 110° C. to 300° C., more preferably 160° C. to 300° C. and still more preferably 200° C. to 280° C., because low fuel permeability is excellent.

With regard to the tetrafluoroethylene•ethylene copolymer (ETFE), the TFE unit is, with respect to the whole of the polymerization units, preferably 62% by mol or more and more preferably 63% by mol or more. Further, the TFE unit is preferably 67% by mol or less and more preferably 66% by mol or less. Further, the ETFE is also preferably one having a polymerization unit originated from a monomer copolymerizable with ethylene and TFE. As the monomer copolymerizable with ethylene and TFE, preferable is at least one fluorine-containing vinyl monomer (d) selected from the group consisting of, for example, monomers represented by the following formula (1):

$$CH_2=CX^1Rf^1 \tag{1};$$

monomers represented by the following formula (2):

$$CF_2=CFRf^1 \tag{2};$$

monomers represented by the following formula (3):

$$CF_2=CFORf^1 \tag{3; and}$$

monomers represented by the following formula (4):

$$CH_2=C(Rf^1)_2 \tag{4}.$$

In the formulae (1) to (4), $X^1$ denotes a hydrogen atom or a fluorine atom, and $Rf^1$ denotes a fluoroalkyl group which may contain an ether linkage oxygen atom. $Rf^1$ is preferably a fluoroalkyl group having 1 to 8 carbon atoms which may contain an ether linkage oxygen atom. $Rf^1$ is more preferably a fluoroalkyl group having 1 to 6 carbon atoms, and especially preferably a fluoroalkyl group having 1 to 4 carbon atoms.

Specific examples of the fluorine-containing vinyl monomers (d) represented by the above formulae (1) to (4) include 1,1-dihydroperfluoropropene-1,1,1-dihydroperfluorobutene-1, perfluoro(1,1,5-trihydro-1-pentene), 1,1,7-trihydroperfluoroheptene-1,1,1,2-trihydroperfluorohexene-1,1,1,2-trihydroperfluorooctene-1,2,2,3,3,4,4,5,5-octafluoropentyl vinyl ether, perfluoro(methyl vinyl ether), perfluoro(propyl vinyl ether), hexafluoropropene and perfluorobutene-1,3,3,3-trifluoro-2-(trifluoromethyl) propene-1.

As the monomer copolymerizable with ethylene and TFE, preferable is particularly a fluorine-containing vinyl monomer (e) represented by the following formula (5):

$$CH_2=CF—(CF_2)_n—X^2 \tag{5}$$

wherein $X^2$ is H or F; and n is an integer of 1 to 10. The n is more preferably an integer of 1 to 3. As the monomer copolymerizable with ethylene and TFE, more preferable is at least one fluorine-containing vinyl monomer selected from the group consisting of perfluoro(1,1,5-trihydro-1-pentene) and 1,1-dihydroperfluoropropene-1.

The tetrafluoroethylene•ethylene copolymer (ETFE) is preferably at least one polymer selected from the group consisting of ethylene/TFE copolymers and ethylene/TFE/fluorine-containing vinyl monomer (d) copolymers.

The tetrafluoroethylene•ethylene copolymer (ETFE) is preferably an ethylene/tetrafluoroethylene/(the fluorine-containing vinyl monomer represented by the formula (1)) copolymer, and more preferably an ethylene/tetrafluoroethylene/the fluorine-containing vinyl monomer (e) copolymer. Here, in the present description, the ethylene/tetrafluoroethylene/the fluorine-containing vinyl monomer (e) copolymer means a copolymer composed of a polymerization unit originated from ethylene, a polymerization unit originated from TFE, and a polymerization unit originated from the fluorine-containing vinyl monomer (e).

In the tetrafluoroethylene•ethylene copolymer (ETFE), the total of the polymerization units originated from ethylene and TFE is, with respect to the whole of the polymerization units, preferably 90 to 99.0% by mol, more preferably 95 to 99.9% by mol and still more preferably 96 to 99.8% by mol.

In the tetrafluoroethylene•ethylene copolymer (ETFE), the polymerization unit originated from the monomer copolymerizable with ethylene and TFE is, with respect to the whole of the polymerization units, preferably 0.1 to 10% by mol, more preferably 0.1 to 5% by mol and especially preferably 0.2 to 4% by mol.

When the tetrafluoroethylene•ethylene copolymer (ETFE) is one having the polymerization unit originated from the monomer copolymerizable with ethylene and TFE, the ethylene unit is, with respect to the whole of the polymerization units, preferably 30 to 39.9% by mol and more preferably 36 to 39.8% by mol.

The tetrafluoroethylene•ethylene copolymer (ETFE) may be one having at least one reactive functional group selected from the group consisting of a carbonyl group, a hydroxyl group, a heterocyclic group and an amino group introduced on main chain terminals and/or side chains of the polymer.

The copolymer is preferably one having a molar ratio (TFE unit/ethylene unit) of the TFE unit and the ethylene unit of 20 to 90/80 to 10. A more preferable molar ratio is 37 to 85/63 to 15, and a still more preferable molar ratio is 38 to 80/62 to 20.

The tetrafluoroethylene•vinylidene fluoride copolymer contains a vinylidene fluoride unit, and the vinylidene fluoride unit accounts for 10.0 to 100% by mol of the whole of the monomer units constituting the fluororesin. The vinylidene fluoride unit accounts for preferably 10.0 to 70.0% by mol of the whole of the monomer units constituting the fluororesin.

The tetrafluoroethylene•vinylidene fluoride copolymer preferably further contains a tetrafluoroethylene unit. In this case, the vinylidene fluoride unit accounts for 10.0 to 70.0% by mol of the whole of the monomer units constituting the fluororesin, and the tetrafluoroethylene unit accounts for 30.0 to 85.0% by mol of the whole of the monomer units constituting the fluororesin. More preferably, the vinylidene fluoride unit accounts for 15.0 to 60.0% by mol of the whole of the monomer units constituting the fluororesin, and the tetrafluoroethylene unit accounts for 40.0 to 85.0% by mol of the whole of the monomer units constituting the fluororesin.

The tetrafluoroethylene•vinylidene fluoride copolymer preferably further contains the tetrafluoroethylene unit and at least one ethylenic unsaturated monomer unit selected from the group consisting of ethylenic unsaturated monomers represented by the formula (1) and the formula (2).

$$CX^{11}X^{12}=CX^{13}(CX^{14}X^{15})_{n^{11}}X^{16} \quad \text{Formula (1):}$$

wherein $X^{11}$ to $X^{16}$ are the same or different and denote H, F or Cl; $n^{11}$ denotes an integer of 0 to 8; here, excluding tetrafluoroethylene and vinylidene fluoride.

$$CX^{21}X^{22}=CX^{23}-O(CX^{24}X^{25})_{n^{21}}X^{26} \quad \text{Formula (2):}$$

wherein $X^{21}$ to $X^{26}$ are the same or different and denote H, F or Cl; $n^{21}$ denotes an integer of 0 to 8.

As the ethylenic unsaturated monomer represented by the formula (1), preferable is at least one selected from the group consisting of $CF_2=CFCl$, $CF_2=CFCF_3$, the following formula (3):

$$CH_2=CF-(CF_2)_{n^{11}}X^{16} \quad (3)$$

wherein $X^{16}$ and $n^{11}$ are the same as in the above, and the following formula (4):

$$CH_2=CH-(CF_2)_{n^{11}}X^{16} \quad (4)$$

wherein $X^{16}$ and $n^{11}$ are the same as in the above; more preferable is at least one selected from the group consisting of $CF_2=CFCl$, $CH_2=CFCF_3$, $CH_2=CH-C_4F_9$, $CH_2=CH-C_6F_{13}$, $CH_2=CF-C_3F_6H$ and $CF_2=CFCF_3$; still more preferable is at least one selected from the group consisting of $CF_2=CFCl$, $CH_2=CH-C_6F_{13}$, $CH_2=CF-C_3F_6H$ and $CH_2=CFCF_3$.

As the ethylenic unsaturated monomer represented by the formula (2), preferable is at least one selected from the group consisting of $CF_2=CF-OCF_3$, $CF_2=CF-OCF_2CF_3$ and $CF_2=CF-OCF_2CF_2CF_3$.

When the fluororesin further contains the tetrafluoroethylene unit and the ethylenic unsaturated monomer, preferably, the vinylidene fluoride unit accounts for 10.0 to 49.9% by mol of the whole of the monomer units constituting the fluororesin; the tetrafluoroethylene unit accounts for 50.0 to 85.0% by mol of the whole of the monomer units constituting the fluororesin; and the ethylenic unsaturated monomer unit accounts for 0.1 to 5.0% by mol of the whole of the monomer units constituting the fluororesin. More preferably, the vinylidene fluoride unit accounts for 25.0 to 49.9% by mol of the whole of the monomer units constituting the fluororesin; the tetrafluoroethylene unit accounts for 50.0 to 70.0% by mol of the whole of the monomer units constituting the fluororesin; and the ethylenic unsaturated monomer unit accounts for 0.1 to 5.0% by mol of the whole of the monomer units constituting the fluororesin.

The tetrafluoroethylene•vinylidene fluoride copolymer is preferably a copolymer containing copolymerization units of 55.0 to 90.0% by mol of tetrafluoroethylene, 5.0 to 44.9% by mol of vinylidene fluoride and 0.1 to 10.0% by mol of an ethylenic unsaturated monomer represented by the formula (1). The tetrafluoroethylene•vinylidene fluoride copolymer is more preferably a copolymer containing copolymerization units of 55.0 to 85.0% by mol of tetrafluoroethylene, 10.0 to 44.9% by mol of vinylidene fluoride and 0.1 to 5.0% by mol of the ethylenic unsaturated monomer represented by the formula (1). The tetrafluoroethylene•vinylidene fluoride copolymer is still more preferably a copolymer containing copolymerization units of 55.0 to 85.0% by mol of tetrafluoroethylene, 13.0 to 44.9% by mol of vinylidene fluoride and 0.1 to 2.0% by mol of the ethylenic unsaturated monomer represented by the formula (1).

The ethylenic unsaturated monomer represented by the formula (1) is preferably at least one monomer selected from the group consisting of $CH_2=CH-C_4F_9$, $CH_2=CH-C_6F_{13}$ and $CH_2=CF-C_3F_6H$, because low permeability of the fluororesin becomes especially excellent. More preferably, the ethylenic unsaturated monomer represented by the formula (1) is at least one monomer selected from the group consisting of $CH_2=CH-C_4F_9$, $CH_2=CH-C_6F_{13}$ and $CH_2=CF-C_3F_6H$; and the fluororesin is a copolymer containing copolymerization units of 55.0 to 80.0% by mol of tetrafluoroethylene, 19.5 to 44.9% by mol of vinylidene fluoride and 0.1 to 0.6% by mol of the ethylenic unsaturated monomer represented by the formula (1).

The tetrafluoroethylene•vinylidene fluoride copolymer may be a copolymer containing copolymerization units of 58.0 to 85.0% by mol of tetrafluoroethylene, 10.0 to 41.9% by mol of vinylidene fluoride and 0.1 to 5.0% by mol of an ethylenic unsaturated monomer represented by the formula (1).

The tetrafluoroethylene•vinylidene fluoride copolymer is also preferably a copolymer containing copolymerization units of 55.0 to 90.0% by mol of tetrafluoroethylene, 9.2 to 44.9% by mol of vinylidene fluoride and 0.1 to 0.8% by mol of an ethylenic unsaturated monomer represented by the formula (2). More preferably, the tetrafluoroethylene•vinylidene fluoride copolymer is a copolymer containing copolymerization units of 58.0 to 85.0% by mol of tetrafluoroethylene, 14.5 to 39.9% by mol of vinylidene fluoride and 0.1 to 0.5% by mol of the ethylenic unsaturated monomer represented by the formula (2).

The tetrafluoroethylene•vinylidene fluoride copolymer is also preferably a copolymer containing copolymerization units of 55.0 to 90.0% by mol of tetrafluoroethylene, 5.0 to 44.8% by mol of vinylidene fluoride, 0.1 to 10.0% by mol of an ethylenic unsaturated monomer represented by the formula (1) and 0.1 to 0.8% by mol of an ethylenic unsaturated monomer represented by the formula (2). More preferably, the tetrafluoroethylene•vinylidene fluoride copolymer is a copolymer containing copolymerization units of 55.0 to 85.0% by mol of tetrafluoroethylene, 9.5 to 44.8% by mol of vinylidene fluoride, 0.1 to 5.0% by mol of the ethylenic unsaturated monomer represented by the formula (1) and 0.1 to 0.5% by mol of the ethylenic unsaturated monomer represented by the formula (2). Still more preferably, the tetrafluoroethylene•vinylidene fluoride copolymer is a copolymer containing copolymerization units of 55.0 to 80.0% by mol of tetrafluoroethylene, 19.8 to 44.8% by mol of vinylidene fluoride, 0.1 to 2.0% by mol of the ethylenic unsaturated monomer represented by the formula (1) and 0.1 to 0.3% by mol of the ethylenic unsaturated monomer represented by the formula (2). When the fluororesin of the present invention has this composition, the fluororesin is especially excellent in low permeability.

The tetrafluoroethylene•vinylidene fluoride copolymer may also be a copolymer containing copolymerization units of 58.0 to 85.0% by mol of tetrafluoroethylene, 9.5 to 39.8% by mol of vinylidene fluoride, 0.1 to 5.0% by mol of an ethylenic unsaturated monomer represented by the formula (1) and 0.1 to 0.5% by mol of an ethylenic unsaturated monomer represented by the formula (2). The fluororesin according to the present invention may also be one having at least one reactive functional group selected from the group consisting of a carbonyl group, a hydroxyl group, a hetrocyclic group and an amino group introduced on main chain terminals and/or side chains of the polymer.

In the present description, the "carbonyl group" is a carbon divalent group having a carbon-oxygen double bond, and represented by —C(=O)—. The reactive functional group including the carbonyl group is not especially limited, and examples thereof include groups containing a carbonyl group(s) as a part of the chemical structure, such as a carbonate group, a carboxylic acid halide group (halogenoformyl group), a formyl group, a carboxyl group, an ester bond (—C(=O)O—), an acid anhydride bond (—C(=O)O—C(=O)—), an isocyanate group, an amido group, an imido group (—C(=O)—NH—C(=O)—), a urethane bond (—NH—C(=O)O—), a carbamoyl group (NH$_2$—C(=O)—), a carbamoyloxy group (NH$_2$—C(=O)O—), a ureido group (NH$_2$—C(=O)—NH—) and an oxamoyl group (NH$_2$—C(=O)—C(=O)—).

In an amido group, an imido group, a urethane bond, a carbamoyl group, a carbamoyloxy group, a ureido group, an oxamoyl group and the like, a hydrogen atom(s) bonded to their nitrogen atom may be replaced by a hydrocarbon group(s), for example, an alkyl group(s).

The reactive functional group is preferably an amido group, a carbamoyl group, a hydroxyl group, a carboxyl group, a carbonate group, a carboxylic acid halide group or an acid anhydride bond, and more preferably an amido group, a carbamoyl group, a hydroxyl group, a carbonate group, a carboxylic acid halide group or an acid anhydride bond, in that the introduction of these is easy and in that the fluororesin comes to have suitable heat resistance and good adhesiveness at relatively low temperatures.

The melting point of the melt shapable fluororesin is preferably 150° C. to 320° C., more preferably 160° C. to 270° C., still more preferably 200° C. to 260° C. and most preferably 230° C. to 260° C.

In the present invention, the melting point of the melt shapable fluororesin is a value obtained by using a Seiko DSC analyzer, recording a melting peak in a temperature-rise rate of 10° C./min and taking a temperature corresponding to the maximum value as the melting point.

The MFR of the melt shapable fluororesin is, under the condition of a load of 5 kg and at a measuring temperature (for example, in the case of THV, 265° C., in the case of a polymer having the ETFE or CTFE unit, 297° C.) determined by kind of the fluororesin, preferably 1 g/10 min to 100 g/10 min, more preferably 5 g/10 min to 60 g/10 min, still more preferably 11 g/10 min to 40 g/10 min and most preferably 20 g/10 min to 35 g/10 min.

In the present invention, the MFR is a value obtained by using a melt indexer and acquiring a mass (g/10 min) of a polymer flowing out per 10 min from a nozzle of 2 mm in inner diameter and 8 mm in length according to ASTM D1238.

The fluororesin can be obtained by a conventionally known polymerization method such as suspension polymerization, solution polymerization, emulsion polymerization or bulk polymerization. In the polymerization, each condition such as temperature or pressure, and a polymerization initiator and other additives can suitably be set depending on the composition and the amount of a fluorine-containing polymer.

The fluororesin may be in a form of its blend further containing various fillers such as inorganic powder, glass fibers, carbon powder, carbon fibers and metal oxides in the ranges of not impairing the performance according to the purpose and application.

For example, in order to more reduce fuel permeability, there may be added smectite layered clay minerals such as montmorillonite, beidellite, saponite, nontronite, hectorite, sauconite and stevensite, and fine layered minerals having a high aspect ratio, such as mica.

Further in order to impart electroconductivity, an electroconductive filler may be added. The electroconductive filler is not especially limited, and examples thereof include electroconductive simple substance powder or electroconductive simple substance fibers of metals, carbon or the like, powder of electroconductive compounds, such as zinc oxide, and surface-electroconductivity-imparted powder. When the electroconductive filler is to be blended in the blend, it is preferable to melt kneading the electroconductive filler and the fluororesin and fabricate pellets beforehand.

The electroconductive simple substance powder or electroconductive simple substance fibers are not especially limited, and examples thereof include metal powders of copper, nickel or the like, metal fibers of iron, stainless steel or the like, carbon black, carbon fibers, and carbon fibrils described in JP H3-174018 A.

The surface-electroconductivity-imparted powder is a powder obtained by subjecting the surface of non-electroconductive powder of glass beads, titanium oxide or the like to an electroconductivity imparting treatment.

A method of the electroconductivity imparting treatment is not especially limited, and includes, for example, metal sputtering and electroless plating.

Among the electroconductive fillers, carbon black, since being advantageous in the viewpoint of economic efficiency and prevention of accumulation of electrostatic charge, is suitably used.

The volume resistivity of the fluororesin composition containing the electroconductive filler is preferably $1\times10^0$ to $1\times10^9$ Ω·cm. The more preferable lower limit is $1\times10^2$ Ω·cm, and the more preferable upper limit is $1\cdot10^8$ Ω·cm.

Further in addition to the fillers, there may be contained a thermal stabilizer, a reinforcing agent, an ultraviolet absorbent, a pigment and other optional additives.

<Laminate>

The laminate of the present invention is a laminate made by laminating a layer comprising the copolymer composition and a layer comprising the melt shapable fluororesin.

The laminate of the present invention can be produced by laminating a layer comprising the copolymer composition and a layer comprising the fluororesin. The laminate of the present invention may be one made by laminating a layer comprising the copolymer composition on both sides of a layer comprising the fluororesin, or may be one made by laminating a layer comprising the fluororesin on both sides of a layer comprising the copolymer composition.

The lamination of a layer comprising the copolymer composition and a layer comprising the fluororesin may be carried out by any method of a method in which a layer comprising the copolymer composition and a layer comprising the fluororesin are separately shaped and thereafter laminated by means of pressure bonding or the like, a method in which a layer comprising the copolymer composition and a layer comprising the fluororesin are simultaneously shaped and laminated, and a method in which a layer comprising the fluororesin is applied on a layer comprising the copolymer composition.

In the method in which a layer comprising the copolymer composition and a layer comprising the fluororesin are separately shaped and thereafter laminated by means of pressure bonding or the like, a shaping method of the fluororesin and a shaping method of the copolymer composition can be adopted individually.

The shaping of the layer comprising the copolymer composition can be performed by applying the copolymer composition to a heat compression molding method, a transfer molding method, an extrusion method, an injection molding method, a calendering method, a coating method or the like, to give shaped products of various shapes such as sheet shapes and tube shapes.

The layer comprising the fluororesin can be shaped by a method of heat compression molding, melt extrusion, injection molding, coating (including powder coating) or the like. For the shaping, there can be used a molding machine usually used for fluororesins, for example, an injection molding machine, a blow molding machine, an extrusion machine and various types of coating apparatuses, and laminates of various shapes such as sheet shapes and tube shapes can be produced. Among these, the melt extrusion method is preferable from the viewpoint of being excellent in productivity.

As described later, when another polymer layer is laminated on the layer comprising the fluororesin, there can be applied a shaping method of multilayer extrusion, multilayer blow molding, multilayer injection molding or the like, to give multilayer shaped products such as multilayer tubes, multilayer hoses and multilayer tanks.

The method in which a layer comprising the copolymer composition and a layer comprising the fluororesin are simultaneously shaped and laminated include a method of using the copolymer composition and the fluororesin to form the layer comprising the fluororesin, and shaping and simultaneously laminating these by a method such as a multilayer compression molding method, a multilayer transfer molding method, a multilayer extrusion method, a multilayer injection molding method or a doubling method. This method, since a layer comprising the copolymer composition, which is an unvulcanized shaped product, and a layer comprising the fluororesin can be laminated simultaneously, does not especially need a step of tightly adhering the layer comprising the copolymer composition and the layer comprising the fluororesin, and is suitable for developing firm adhesion in a later vulcanization step.

Although the laminate of the present invention may be a laminate of a layer comprising an unvulcanized copolymer composition and a layer comprising the fluororesin, further by vulcanizing the unvulcanized laminate, a firm interlayer adhesion force can be given.

That is, the present invention relates also to a vulcanized laminate in which a layer comprising a copolymer composition obtained by vulcanizing the unvulcanized laminate of the present invention and a layer comprising the fluororesin are vulcanizedly adhered.

The laminate of the present invention has suitable characteristics as various types of known products, for example, seals such as gaskets and noncontact type and contact type packings (self-seal packings, piston rings, split ring type packings, mechanical seals, oil seals, and the like), bellows, diaphragms, hoses, tubes, electric wire and the like, which require heat resistance, oil resistance, fuel resistance, LLC resistance and steam resistance, for engine main units, main moving systems, valve systems, lubrication and cooling systems, fuel systems, air intake and exhaust systems and the like of automobile engines, transmission systems of drive systems, steering systems of chassis, brake systems and the like, and standard electrical parts, control system electrical parts and accessory electrical parts of electrical units, and the like.

Specifically, the laminate can be used in applications listed below.

In the engine main units, gaskets such as cylinder head gaskets, cylinder head cover gaskets, oil pan packings and general gaskets, seals such as O-rings, packings and timing belt cover gaskets, hoses such as control hoses, rubber cushions of engine mounts, sealants for high-pressure valves in hydrogen storage systems, and the like. In the main moving systems, shaft seals such as crank shaft seals, camshaft seals and the like. In the valve systems, valve stem seals of engine valves, and the like. In the lubricating and cooling systems, engine oil cooler hoses, oil return hoses, seal gaskets and the like of engine oil coolers, water hoses around radiators, and vacuum pump oil hoses of vacuum pumps.

In the fuel systems, oil seals, diaphragms, valves and the like of fuel pumps, fuel hoses such as filler (neck) hoses, fuel supply hoses, fuel return hoses and vapor (evaporator) hoses, in-tank hoses, filler seals, tank packings, in-tank fuel pump mounts and the like of fuel tanks, tube bodies, connector O-rings and the like of fuel line tubes, injector cushion rings, injector seal rings, injector O-rings, pressure regulator diaphragms, check valves and the like of fuel injection systems, needle valve petals, accelerating pump pistons, flange gaskets, control hoses and the like of carburetors, and valve sheets, diaphragms and the like of compound air controllers (CAC). Among these, the laminate is suitable as fuel hoses, and in-tank hoses of fuel tanks.

In the air intake and exhaust systems, air intake manifold packings, exhaust manifold packings and the like of manifolds, diaphragms, control hoses, emission control hoses and the like of EGR (exhaust gas recirculation), diaphragms and the like of BPT, after burn preventing valve sheets and the like of AB valves, throttle body packings of throttles, and turbo oil hoses (supply), turbo oil hoses (return), turbo air hoses, intercooler hoses, turbine shaft seals and the like of turbochargers.

In the transmission systems, bearing seals, oil seals, O-rings, packings, torque converter hoses and the like related to transmissions, and transmission oil hoses, ATF hoses, O-rings, packings and the like of AT.

In the steering systems, power steering oil hoses and the like.

In the brake systems, oil seals, O-rings, packings, brake oil hoses and the like, breather valves, vacuum valves, diaphragms and the like of master backs, piston cups (rubber cups) of master cylinders, caliper seals, boots, and the like.

In the standard electrical parts, insulators, sheaths and the like of electric wire (harnesses), and tubes and the like of harness exterior parts.

In the control electrical parts, covering materials for wire of various types of sensors, and the like.

In the accessory electrical parts, O-rings, packings and cooler hoses of car air conditioners, wiper blades as exterior parts, and the like.

In applications other than to automobiles, the laminate is suitable for applications, for example, to oil-resistant, chemical-resistant, heat-resistant, steam-resistant or weather-resistant packings, O-rings, hoses, other sealants, diaphragms and valves in transportations such as marine vessels and aircrafts, similar packings, O-rings, sealants, diaphragms, valves, hoses, rolls, tubes and chemical-resistant coating and lining in chemical plants, hoses or gaskets in chemical process fields, similar packings, O-rings, hoses, sealants, belts, diaphragms, valves, rolls and tubes in food plant devices and food devices (including household articles), similar packings, O-rings, hoses, sealants, diaphragms, valves and tubes in nuclear power plants, similar packings, O-rings, hoses, sealants, diaphragms, valves, rolls, tubes, linings, mandrels, electric wire, flexible joints, belts, rubber plates, weather strips, roll blades of PPC copying machines, and the like in OA devices and usual industrial parts. For example, although a backup rubber of a PTFE diaphragm, since being poor in slipperiness, has a problem of being abraded or broken during its use, use of the laminate of the present invention enables the problem to be improved, and the laminate can suitably be used.

In applications to rubber sealants for food, although conventional rubber sealants have trouble with odor impartation and mingling of rubber chips and the like into food, use of the laminate of the present invention enables the problem to be improved, and the laminate can suitably be used. Although rubber materials used as sealants for piping in medicinal and chemical applications, which materials use solvents for the rubber sealants, have a problem with swelling thereof in the solvents, use of the laminate of the present invention improves the problem by covering the resin therewith. In general industrial fields, in aims at improving strength, slipperiness, chemical resistance and permeability of the rubber materials, there can suitably be used, for example, for rubber rolls, O-rings, packings and sealants. In particular, in applications to packings for lithium ion batteries, the laminate can suitably be used because both of the chemical resistance and the sealability can simultaneously be maintained. Additionally, in applications requiring the slidability due to low friction, the laminate can suitably be used.

Medical applications include medicine stoppers, cap seals of bottles, can seals, medical tapes, medical pads, injector syringe packings, base materials for transdermal medicines, nipples of nursing bottles and the like, medical bags, catheters, infusion sets, mixing injection tubes, cap liners, caps of vacuum blood collecting tubes, gaskets for syringes, transfusion tubes, gaskets and caps of medical equipment, syringe tips, grommets, blood collecting tube caps, cap seals, packings, O-rings, sheath introducers, dilators, guiding sheaths, blood circuits, artificial heart and lung circuits, tubes for Rotablator, indwelling needles, infusion sets, transfusion tubes, closed infusion systems, infusion solution bags, blood bags, blood constituent separating bags, tubes for blood constituent separating bags, artificial blood vessels, arterial cannulae, stents, endoscopic treatment implement-protecting tubes, endoscope tubes, endoscope top overtubes, guide tubes for pharynx passage, tubes for coronary artery bypass operations, ileus tubes, tubes for transdermal transhepatic biliary tract drainage operations, electrotome exterior tubes, ultrasonic scalpel exterior tubes, separating forcep exterior tubes, and bags for cell cultivation.

Shaped products for offshore to which the laminate of the present invention can be applied include tubes or hoses (including injection tubes and crude oil transfer tubes) for offshore oil fields. Among these, particularly the laminate can suitably be used as tubes or hoses. That is, it is preferable that the laminate is also a tube or a hose. Among tubes, the laminate can suitably be utilized as a fuel line tube or hose for automobiles from the viewpoint of heat resistance and low fuel permeability.

A fuel line composed of the laminate of the present invention can be produced by a usual method, and the production method thereof is not especially limited.

The laminate of the present invention is constituted of a layer comprising the copolymer composition and a layer comprising the fluororesin, but depending on the application, in addition to the above layers, may have other layers composed of other substances including, for example, dienic rubbers such as acrylonitrile-butadiene rubber (NBR) or hydride thereof (HNBR), styrene-butadiene rubber (SBR), chloroprene rubber (CR), butadiene rubber (BR), natural rubber (NR) and isoprene rubber (IR), silicone rubber, butyl rubber, epichlorhydrin rubber (ECO), polyacryl esters (ACM) and fluororubber (FKM).

Among these rubbers, preferable are NBR, HNBR, ECO, ACM and FKM, which are excellent in oil resistance.

In order to improve adhesion strength with the above fuel barrier polymer layer, it is preferable that to these rubbers, there are added the above compound (C), further magnesium oxide, a dialkylcarbamic acid metal salt and the like.

EXAMPLES

Hereinafter, the present invention will be described in more detail by way of Examples, but the present invention is not limited to these Examples.

There are shown below ethylene-α-olefin-nonconjugated polyene copolymers used in Examples and Comparative Examples.

<Ethylene-α-olefin-Nonconjugated Polyene Copolymers>

As ethylene-α-olefin-nonconjugated polyene copolymers (A), there were used the following commercially available ethylene-α-olefin-nonconjugated polyene copolymers (EPDM).
(1) Mitsui EPT 9090M: having ML(1+4)125° C. (ASTM D1646) of 58; having an ethylene content (ASTM D3900) of 41% by weight; having an ENB content (ASTM D6047) of 14.0% by weight; manufactured by Mitsui Chemicals, Inc.
(2) Mitsui EPT 3092M: having ML(1+4)125° C. (ASTM D1646) of 61; having an ethylene content (ASTM D3900) of 65% by weight; having an ENB content (ASTM D6047) of 4.6% by weight; manufactured by Mitsui Chemicals, Inc.

Fluororesins used in Examples and Comparative Examples are shown in Table 1.
<Fluororesins>

TABLE 1

Physical properties of the fluororesins and the like shown in Table 1 were measured by the following measuring methods.

| | Composition (% by mol) | Melting point (° C.) | MFR (g/10 min) | Fuel permeability coefficient (g · mm/m$^2$/day) | Sheet thickness (mm) |
|---|---|---|---|---|---|
| Fluororesin (1) | CTFE/TFE/PPVE copolymer 21.3/76.3/24 | 248 | 29.2 (297° C.) | 0.4 | 120 |
| Fluororesin (2) | CTFE 100 | 210 | — | 4.7 | 120 |
| Fluororesin (3) | TFE/Et/perfluoro(1,1,5-trihydro-1-penetene) 64.8/33.0/2.4 | 220 | 31.2 (297° C.) | 5 | 120 |
| Fluororesin (4) | THV (manufactured by 3M Co., THV 500G Z) | 165 | 10 (265° C.) | 10 | 120 |
| Fluororesin (5) | THV (manufactured by 3M Co., THV 815G Z) | 225 | 12 (265° C.) | 2.5 | 120 |
| Fluororesin (6) | TFE/VdF/ CH$_2$=CHCF$_2$CF$_2$CF$_2$CF$_2$CF$_2$CF$_3$ 60.1/39.6/0.3 | 218 | 2.6 (297° C.) | — | 120 |

<Evaluation of Physical Properties of the Fluororesins>
(1) Composition of the Fluororesin The composition of the fluororesin was measured by $^{19}$F-NMR analysis.
(2) Melting Point The melting point was obtained by using a Seiko DSC analyzer, recording a melting peak in a temperature-rise rate of 10° C./min and taking a temperature corresponding to the maximum value as the melting point.
(3) MFR (Melt Flow Rate)

The MFR was obtained by using a melt indexer (manufactured by Toyo Seiki Seisaku-sho Ltd.) and measuring a weight (g) of a polymer flowing out in the unit time (10 min) from a nozzle of 2 mm in diameter and 8 mm in length at various temperatures under a load of 5 kg.
(4) Measurement of the Fuel Permeability Coefficient of a Single Layer Resin pellets were charged in a metal mold of 120 mm in diameter, set on a press machine heated at 300° C., and melt pressed at a pressure of about 2.9 MPa, to give a sheet of 0.12 mm in thickness. The obtained sheet was put in a SUS 316-made cup for measuring the permeability coefficient of 40 mmφ in inner diameter and 20 mm in height in which 18 mL of CE10 (a fuel prepared by mixing a mixture of isooctane and toluene in 50:50 in volume ratio with 10% by volume of ethanol) was charged, and the change in mass at 60° C. was measured until 1,000 hours. The fuel permeability coefficient (g·mm/m$^2$/day) was calculated from the change in mass per hour, the surface area of the sheet contacting with the fuel, and the thickness of the sheet.

Example 1

(Preparation of a Copolymer Composition Containing EPDM)

As the first stage, 100 parts by mass of Mitsui EPT 9090M was masticated for 30 seconds by using a BB-2 type Banbury mixer (manufactured by Kobe Steel, Ltd.); then, there were added thereto 50 parts by mass of SRF carbon black (Asahi #50, manufactured by Asahi Carbon Co., Ltd.), 20 parts by mass of basic silica (Carplex® 1120, manufactured by Evonik Degussa GmbH), 5 parts by mass of zinc white (manufactured by Hakusui Tech Co., Ltd.), 1 part by mass of stearic acid, 10 parts by mass of magnesium oxide (Kyowamag 150, manufactured by Kyowa Chemical Industry Co., Ltd.) and 25 parts by mass of a naphthenic process oil (Sunpar 4240, manufactured by Japan Sun Oil Co., Ltd.), and the resultant was kneaded at 140° C. for 2 min. Thereafter, the ram of the mixer was lifted and cleaning was carried out; and the resultant was further kneaded for 1 min, and then discharged at about 150° C. to thereby obtain a first-stage compound.

Then, as the second stage, the compound obtained in the first stage was wound on an 8-inch roll (manufactured by Nippon Roll Mfg. Co., Ltd., front roll surface temperature: 50° C., rear roll surface temperature: 50° C., front roll rotating speed: 16 rpm, rear roll rotating speed: 18 rpm); and there was added thereto 2.0 parts by mass of a DBU formic acid salt (U-CAT SA®, manufactured by San-Apro Ltd.), 2.0 parts by mass of N-oxydiethylene-2-benzothiazolylsulfeneamide (Nocceler MSA-G, manufactured by Ouchi Shinko Chemical Industry Co., Ltd.), 0.2 part by mass of a thiazol-based crosslinking accelerator (Nocceler MZ, manufactured by Ouchi Shinko Chemical Industry Co., Ltd.), 1.0 part by mass of copper dimethyldithiocarbamate (Nocceler TTCU, manufactured by Ouchi Shinko Chemical Industry Co., Ltd.), and 1.5 parts by mass of sulfur (manufactured by Junsei Chemical Co., Ltd.), and the resultant was kneaded for 10 min, to give an unvulcanized copolymer composition (copolymer compound).

Then, a sheet of about 1 mm in thickness was fabricated by using the unvulcanized copolymer composition, and superposed on a sheet of the fluororesin (1) having the thickness indicated in Table 1; a Lumilar (trade name: polyester sheet, manufactured by Toray Industries, Inc.) of about 10 mm to 15 mm in width was interposed between edge portions of one side of both the superposed sheets; thereafter, the resultant was inserted in a metal mold having a metal spacer so put therein that the thickness of an obtained sheet became 1 mm, and pressed at 160° C. for 45 min, to give a laminate.

Then, the obtained laminate was cut into three sets of a strip shape of 10 mm in width and 40 mm in length; and the sheet of the fluororesin (1) of the edge portion was peeled to fabricate a test piece with the peeled edge portion as a grip margin. On this test piece, a peeling test was carried out according to the method described in JIS K6854-3 (T-shaped peeling test) at 25° C. at a tensile rate of 200 mm/min to measure an adhesion strength (peel strength) (N/cm); an average of data of N=3 obtained was calculated and was taken as an adhesion strength. Further the peeling mode was observed and evaluated in the following criteria. The obtained measurement results are shown in Table 2-1.

Examples 2 to 15

Copolymer compositions were each obtained by the method described in Example 1 by using compounding ingredients and the like shown in Table 2 in place of the copolymer composition used in Example 1; thereafter, laminates with the fluororesin (1) were fabricated; and the adhesion strength was determined.

The obtained measurement results are shown in Table 2-1 and Table 2-2.

Here, the aromatic process oil used in Examples 2 to 4 was Diana Process Oil AH-16 (trade name), manufactured by Idemitsu Kosan Co., Ltd. Nocceler BZ-P(BZ) (trade name) used in Example 2 was zinc dibutyldithiocarbamate, manufactured by Ouchi Shinko Chemical Industry Co., Ltd.

Comparative Examples 1 to 3

Copolymer compositions were each obtained by the method described in Example 1 by using compounding ingredients and the like shown in Table 2 in place of the copolymer composition used in Example 1; thereafter, laminates with the fluororesin (1) were fabricated; and the adhesion strength was determined.

The obtained measurement results are shown in Table 2-2.

TABLE 2-1

| | <Compounding formulation> | | Example 1 | Example 2 | Example 3 | Example 4 | Example 5 |
|---|---|---|---|---|---|---|---|
| First Stage | 9090M | parts by mass | 100 | 100 | 100 | 100 | 100 |
| | 3092M | | — | — | — | — | — |
| | stearic acid | | 1 | 1 | 1 | 1 | 1 |
| | MgO | | 10 | 10 | 10 | 10 | 10 |
| | ZnO | | 5 | 5 | 5 | 5 | 5 |
| | Carplex 1120 | | 20 | 20 | 20 | 50 | — |
| | SRF carbon (Asahi 50G) | | 50 | 50 | 50 | 20 | 50 |
| | Sunthene 4240 (naphthenic) | | 25 | — | — | — | 25 |
| | AH-16 (aromatic) | | — | 25 | 25 | 25 | — |
| | Total (parts by mass) | | 211 | 211 | 211 | 211 | 191 |
| Second Stage | DBU SA603 | | 2.0 | 2.0 | 4.0 | 4.0 | 4.0 |
| | MSA | | 1.0 | 1.0 | 1.0 | 1.0 | 1.0 |
| | MZ | | 0.2 | 0.2 | 0.2 | 0.2 | 0.2 |
| | TTCU | | 1.0 | — | 1.0 | 1.0 | 1.0 |
| | Bz | | — | 1.0 | — | — | — |
| | sulfur | | 1.5 | 1.5 | 1.5 | 1.5 | 1.5 |
| | Total (parts by mass) | | 216.7 | 216.7 | 218.7 | 218.7 | 198.7 |
| | Adhesion strength with the fluororesin (1) | N/cm | 17 | 19 | 20 | 19 | 20 |

| | <Compounding formulation> | | Example 6 | Example 7 | Example 8 | Example 9 |
|---|---|---|---|---|---|---|
| First Stage | 9090M | parts by mass | 100 | 100 | 100 | 100 |
| | 3092M | | — | — | — | — |
| | stearic acid | | 1 | 1 | 1 | 1 |
| | MgO | | 10 | 10 | 10 | 10 |
| | ZnO | | 5 | 5 | 5 | 5 |
| | Carplex 1120 | | 20 | 20 | 20 | 20 |
| | SRF carbon (Asahi 50G) | | 90 | 90 | 90 | 90 |
| | Sunthene 4240 (naphthenic) | | 50 | 50 | 50 | 50 |
| | AH-16 (aromatic) | | — | — | — | — |
| | Total (parts by mass) | | 276 | 276 | 276 | 276 |
| Second Stage | DBU SA603 | | 2.0 | 2.5 | 3.0 | 4.0 |
| | MSA | | 1.0 | 1.0 | 1.0 | 1.0 |
| | MZ | | 0.2 | 0.2 | 0.2 | 0.2 |
| | TTCU | | 1.0 | 1.0 | 1.0 | 1.0 |
| | Bz | | — | — | — | — |
| | sulfur | | 1.5 | 1.5 | 1.5 | 1.5 |
| | Total (parts by mass) | | 281.7 | 282.2 | 282.7 | 283.7 |
| | Adhesion strength with the fluororesin (1) | N/cm | 15 | 21 | 23 | 21 |

TABLE 2-2

| | <Compounding formulation> | | Example 10 | Example 11 | Example 12 | Example 13 | Example 14 |
|---|---|---|---|---|---|---|---|
| First Stage | 9090M | parts by mass | 100 | 100 | 90 | 80 | 70 |
| | 3092M | | — | — | 10 | 20 | 30 |
| | stearic acid | | 1 | 1 | 1 | 1 | 1 |
| | MgO | | 10 | 10 | 10 | 10 | 10 |
| | ZnO | | 5 | 5 | 5 | 5 | 5 |
| | Carplex 1120 | | 20 | 20 | 20 | 20 | 20 |
| | SRF carbon (Asahi 50G) | | 90 | 90 | 90 | 90 | 90 |
| | Sunthene 4240 (naphthenic) | | 50 | 50 | 50 | 50 | 50 |
| | AH-16 (aromatic) | | — | — | — | — | — |
| | Total (parts by mass) | | 276 | 276 | 276 | 276 | 276 |
| Second Stage | DBU SA603 | | 4.0 | 4.0 | 4.0 | 4.0 | 4.0 |
| | MSA | | 1.2 | 1.4 | 1.0 | 1.0 | 1.0 |
| | MZ | | 0.24 | 0.28 | 0.2 | 0.2 | 0.2 |
| | TTCU | | 1.2 | 1.4 | 1.0 | 1.0 | 1.0 |
| | Bz | | — | — | — | — | — |
| | sulfur | | 1.8 | 2.1 | 1.5 | 1.5 | 1.5 |
| | Total (parts by mass) | | 284.4 | 285.2 | 283.7 | 283.7 | 283.7 |
| | Adhesion strength with the fluororesin (1) | N/cm | 21 | 26 | 26 | 19 | 26 |

| | <Compounding formulation> | | Example 15 | Comparative Example 1 | Comparative Example 2 | Comparative Example 3 |
|---|---|---|---|---|---|---|
| First Stage | 9090M | parts by mass | — | 100 | 100 | 100 |
| | 3092M | | 100 | — | — | — |
| | stearic acid | | 1 | 1 | 1 | 1 |
| | MgO | | 10 | 10 | 10 | — |
| | ZnO | | 5 | 5 | 5 | 5 |
| | Carplex 1120 | | 20 | 20 | 20 | 20 |
| | SRF carbon (Asahi 50G) | | 90 | 50 | 50 | 50 |
| | Sunthene 4240 (naphthenic) | | 50 | 25 | — | — |
| | AH-16 (aromatic) | | — | — | 25 | 25 |
| | Total (parts by mass) | | 276 | 211 | 211 | 201 |
| Second Stage | DBU SA603 | | 4.0 | — | — | 2.0 |
| | MSA | | 1.0 | 1.0 | 1.0 | 1.0 |
| | MZ | | 0.2 | 0.2 | 0.2 | 0.2 |
| | TTCU | | 1.0 | 1.0 | 1.0 | 1.0 |
| | Bz | | — | — | — | — |
| | sulfur | | 1.5 | 1.5 | 1.5 | 1.5 |
| | Total (parts by mass) | | 283.7 | 214.7 | 214.7 | 206.7 |
| | Adhesion strength with the fluororesin (1) | N/cm | 27 | not adhered | not adhered | not adhered |

Example 16

By using the copolymer composition obtained in Example 4 and fluororesins (2) to (6) described in Table 1, respectively, a sheet of the copolymer composition having a thickness of about 3 mm and a sheet of the fluororesin having the thickness indicated in Table 1 were superposed; a PTFE film (thickness: 10 μm) of about 10 to 15 mm in width was interposed between edge portions of one side of both the superposed sheets; thereafter, the resultant was pressed at 160° C. for 45 min, to give a sheet-shape laminate.

Then, the obtained laminate was cut into three sets of a strip shape of 10 mm in width and 40 mm in length; and the sheet of the fluororesin of the edge portion was peeled to fabricate a test piece with the peeled edge portion as a grip margin. On this test piece, a peeling test was carried out according to the method described in JIS K6256 (adhesion test method of cross-linked rubber) by using an Autograph (manufactured by Shimadzu Corp., AGS-J 5 kN) at 25° C. at a tensile rate of 50 mm/min to measure an adhesion strength; an average of data of N=3 obtained was calculated and was taken as an adhesion strength.

The obtained measurement results are shown in Table 3.

TABLE 3

| | |
|---|---|
| Adhesion strength with the fluororesin (2) (N/cm)) | 22 |
| Adhesion strength with the fluororesin (3) (N/cm) | 18 |
| Adhesion strength with the fluororesin (4) (N/cm) | 11 |
| Adhesion strength with the fluororesin (5) (N/cm) | 11 |
| Adhesion strength with the fluororesin (6) (N/cm) | 16 |

The invention claimed is:

1. A laminate comprising: a layer comprising an ethylene-α-olefin-nonconjugated polyene copolymer composition, and a layer comprising a melt shapable fluororesin; wherein the ethylene-α-olefin-nonconjugated polyene copolymer composition comprises
100 parts by mass of an ethylene-α-olefin-nonconjugated polyene copolymer (A),
1.0 to 6.0 parts by mass of at least one compound (C) selected from the group consisting of 1,8-diazabicyclo (5.4.0)undecene-7 salts, 1,5-diazabicyclo(4.3.0)nonene-5 salts, 1,8-diazabicyclo(5.4.0)undecene-7 and 1,5-diazabicyclo(4.3.0)nonene-5,
3 to 20 parts by mass of magnesium oxide, and
25 to 200 parts by mass of a mineral oil-based softener (B) selected from naphthenic process oils and aromatic process oil; and
wherein the ethylene-α-olefin-nonconjugated polyene copolymer composition further comprises a crosslinking agent, the crosslinking agent being a sulfur-based compound.

2. The laminate according to claim 1, wherein the compound (C) is a 1,8-diazabicyclo(5.4.0)undecene-7 salt and/or a 1,5-diazabicyclo(4.3.0)nonene-5 salt and is contained in an amount of 1.5 to 6.0 parts by mass, and the laminate further comprises 0.1 to 10 parts by mass of a dialkylcarbamic acid metal salt, with respect to 100 parts by mass of the ethylene-α-olefin-nonconjugated polyene copolymer (A).

3. The laminate according to claim 2, wherein the dialkylcarbamic acid metal salt is a copper salt of dimethyldithiocarbamic acid or a zinc salt of dibutyldithiocarbamic acid.

4. The laminate according to claim 1, wherein the ethylene-α-olefin-nonconjugated polyene copolymer composition further comprises
up to 100 parts by mass of a basic silica,
with respect to 100 parts by mass of the ethylene-α-olefin-nonconjugated polyene copolymer (A).

5. The laminate according to claim 1, wherein the melt shapable fluororesin is at least one selected from the group consisting of polychlorotrifluoroethylene, chlorotrifluoroethylene-based copolymers and tetrafluoroethylene/hexafluoropropylene/vinylidene fluoride copolymers.

6. The laminate according to claim 1, wherein a layer comprising the ethylene-α-olefin-nonconjugated polyene copolymer composition is laminated on each of both sides of a layer comprising the melt shapable fluororesin.

7. The laminate according to claim 1, wherein a layer comprising the melt shapable fluororesin is laminated on each of both sides of a layer comprising the ethylene-α-olefin-nonconjugated polyene copolymer composition.

8. A laminate, obtained by vulcanizing a laminate according to claim 1, wherein both the layers are vulcanizedly adhered.

9. A fuel line tube or hose comprising a laminate according to claim 1.

10. A product comprising a laminate according to claim 1.

11. The laminate according to claim 1, wherein the total amount of the ethylene-α-olefin-nonconjugated polyene copolymer composition is 216.7 parts by mass or more, with respect to 100 parts by mass of the ethylene-α-olefin-nonconjugated polyene copolymer (A).

* * * * *